Patented Aug. 11, 1925.

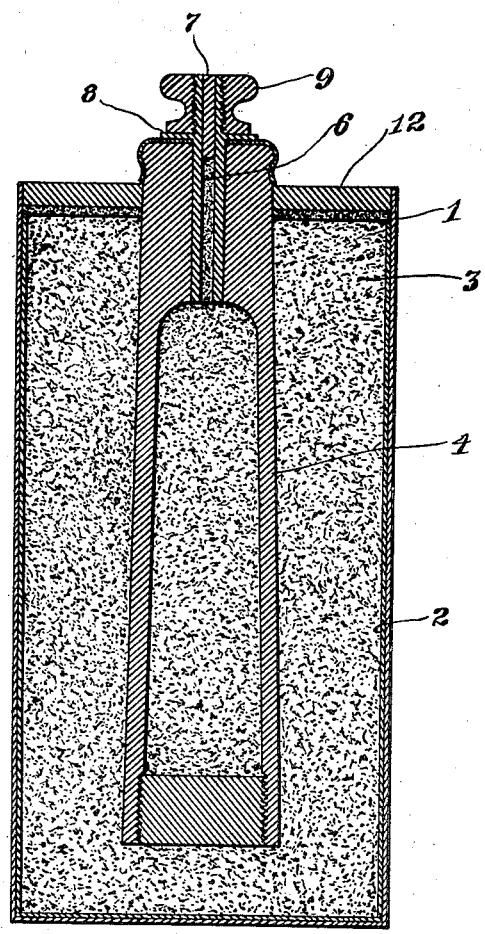

1,549,120

UNITED STATES PATENT OFFICE.

WILLIAM F. HENDRY, OF OSSINING, NEW YORK, ASSIGNOR TO MANHATTAN ELECTRICAL SUPPLY COMPANY, INC., OF NEW YORK, N. Y., A CORPORATION OF MASSACHUSETTS.

DRY CELL.

Application filed October 17, 1923. Serial No. 669,072.

*To all whom it may concern:*

Be it known that I, WILLIAM F. HENDRY, residing at Ossining, New York, in the county of Westchester and State of New York, United States of America, having invented certain new and useful Improvements in Dry Cells, do hereby declare that the following is a full, clear, and exact description of the same.

This invention relates to dry cells and more particularly to an arrangement for prolonging the life of dry cells by insuring a constant supply of moisture for a relatively long period of time.

It is well known that so called dry cells will cease to function when their contents become relatively dry, spongy masses of fibrous material or the like and hygroscopic chemicals being provided for the purpose of holding water for a relatively long period of time. This spongy mass as well as the mass of depolarizing mix is moistened during the process of assembling the dry cell and then the dry cell is sealed. When this water evaporates or is otherwise used up, then the cell must be discarded or may be partially revivified at a relatively great expense and inconvenience by again moistening the battery mix.

In order to obviate some of these difficulties and still obtain a structure in which a relatively large quantity of liquid is held in readiness for use when the liquid in the battery mix is used up, in accordance with the present invention one of the electrodes, e. g. a centrally located carbon electrode encloses a certain quantity of liquid preferably held in some suitable spongy mass. The carbon electrode is porous and as the liquid in the fibrous mass and in the battery mix surrounding the carbon electrode is used up, the liquid within the electrode is permitted to seep out through the pores of the carbon electrode to be absorbed by the mix. The mix is thus maintained for a relatively long time at substantially the same degree of humidity.

It may be thought that an easier remedy would be to put more water in the depolarizing mix, but experience shows that there are very definite limitations to the wetness of the mix. A cell with too wet a mix will "boil over" if put on heavy service while new.

These and other features of the invention will more clearly appear from the following detailed description of an exemplification of the invention and the appended claims.

The invention is illustrated in the drawing representing a cross section of a dry cell.

1 is a zinc can the inside surface of which is covered with the usual paper and paste coating 2. 3 is the battery mix which is introduced into the can around a porous carbon electrode 4. The carbon electrode 4 is hollow, the cavity within the electrode being filled with a spongy mass 5 of fibrous or colloidal material or the like. The upper end of the carbon electrode is longitudinally perforated at 6 through which perforation the hollow space is connected with the outside atmosphere. This communicating channel 6 is adapted to be closed by a stopper 7 which fits within an opening in a dowel 8 projecting within the channel 6. The upper part of the dowel is screw threaded to receive the binding post 9.

In assembling the battery, water is introduced within the hollow space containing the spongy mass 5 until this mass is fully saturated whereupon the open lower end of the carbon electrode is sealed by a stopper 10 of any suitable material. The carbon electrode 4 is then introduced into the zinc can and the assembly of the battery may now proceed in accordance with any of the well known methods in accordance with which either a bobbin is soaked until it absorbs all the mixture it will hold, or water is otherwise introduced into the mix 3 and the cellulose container 2. The cell is then sealed by layers of sand 11 and of pitch 12.

When the hydrostatic pressure on the walls of the porous carbon electrode 4 diminishes, the liquid held in the mass 5 will be permitted to seep out through the pores of the electrode to be absorbed by the surrounding mix 3. When the water in the reservoir is entirely exhausted, water may be reintroduced by removing the stopper 7. However, if it is not desired to arrange the battery for permitting revivifying thereof, the channel 6 is not provided, the upper end of the hollow space being closed to the outside atmosphere. In this case also the life of the battery may be practically doubled by the amount of water contained within the carbon electrode.

It will be seen therefore that without great expenditure, a dry cell is provided the life of which is materially increased by the provision of a reservoir of water. The water in this reservoir is used up as needed without the necessity of rupturing walls or the like, and without the necessity of increasing the size of the cell to accommodate this reservoir.

Obviously, the invention is capable of various other embodiments without departing from the spirit thereof.

What I claim is:

1. In a dry cell, a carbon electrode, a cavity within said electrode, and a mass of spongy material within said cavity.

2. In a dry cell, a zinc can, a carbon electrode centrally located within said can and provided with a cavity containing a spongy mass adapted to hold water, a stopper for closing the lower end of said cavity, a communicating channel between said cavity and the upper end of said carbon electrode, a stopper in said channel, a layer of cellulose material surrounding the inside of said can, and battery mix between said layer of cellulose material and the carbon electrode.

3. In a dry cell, a carbon electrode, a cavity within said electrode, a hollow dowel projecting into the carbon electrode and communicating with said cavity, and a stopper in said dowel.

In witness whereof, I hereunto subscribe my name this 16th day of October 1923.

WILLIAM F. HENDRY.